Oct. 22, 1929.  G. W. BLAIR  1,732,787
FASTENING DEVICE
Filed July 26, 1926
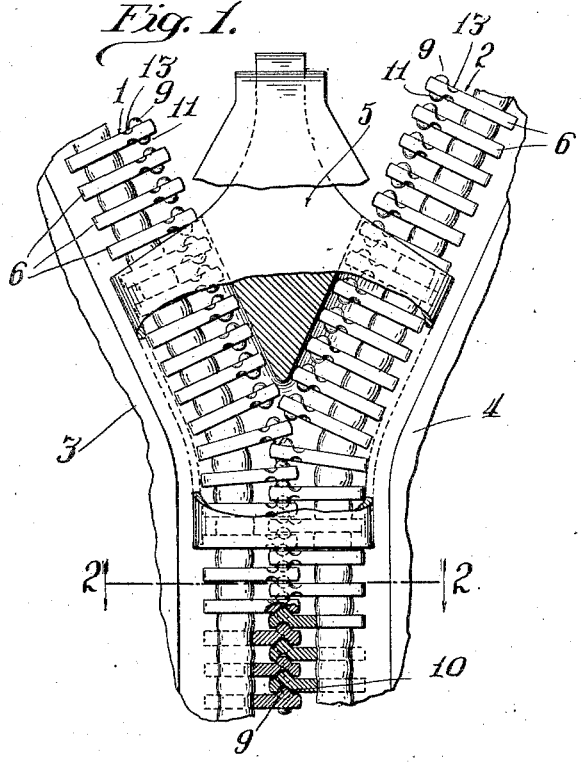
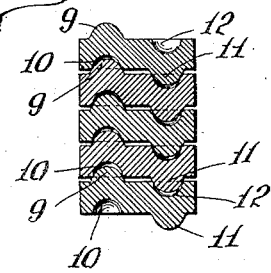
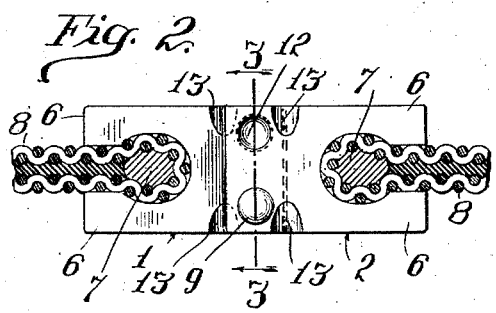
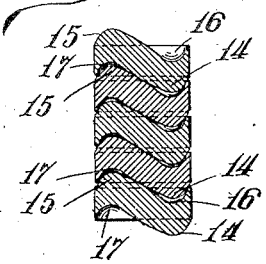
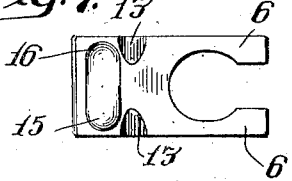
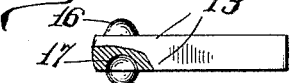
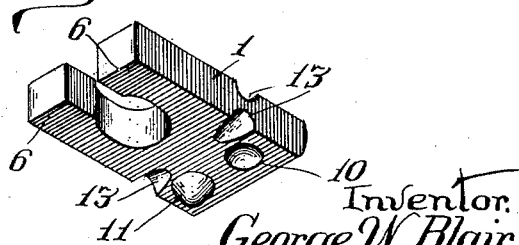
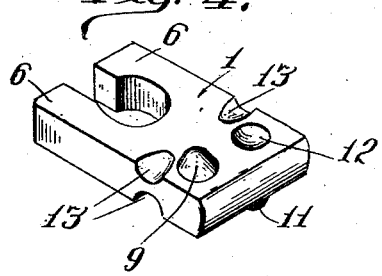
Inventor.
George W. Blair
By Eugene M. Giles
Attorney.

Patented Oct. 22, 1929

1,732,787

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

FASTENING DEVICE

Application filed July 26, 1926. Serial No. 124,855.

My invention relates to fastening devices of the type wherein opposed series of fastener elements are interlocked and released by a cam member or slider which operates along the two series of fastener elements, and has reference more particularly to the form of the interlocking portions of the fastener elements.

The principal objects of my invention are to provide a fastener element having an improved form of interlocking means; to insure a positive interlocking of the elements and increase the security against side slipping or lateral disengagement; to construct the element with reversely arranged pairs of projections and recesses; and in general, to provide a fastening element of a simple form which may be conveniently manufactured and which affords a positive and dependable interlocking.

On the drawings:

Fig. 1 is a front view of fragmentary portions of a fastening device embodying my improvements and showing the slider for operating same, a portion of the latter being broken away to disclose details of the construction;

Fig. 2 is an enlarged view on the line 2—2 of Fig. 1;

Fig. 3 is an enlarged sectional view of a series of interlocked elements taken on the line 3—3 of Fig. 2;

Figs. 4 and 5 are top and bottom perspective views respectively of the element used on one side of the fastener;

Fig. 6 is a view similar to Fig. 3, showing a modified form of the fastener;

Fig. 7 is a top view of an element such as shown in Fig. 6; and

Fig. 8 is an edge view of the element shown in Fig. 7, with a portion broken away.

Referring to the drawings, the reference numerals 1 and 2 indicate the fastener elements which are secured in spaced relation on the parts 3 and 4 respectively and adapted to be interlocked and released in the usual manner by a cam member or slider 5 which operates along the two series of fastener elements. The elements 1 and 2 may be mounted on the parts 3 and 4 in any convenient manner as for example, by forming the elements with a pair of jaws 6—6 which are clamped around the enlarged or corded edge 7 of the part 3 or 4. In practice however, it is customary to mount the elements on a tape or stringer which has the corded edge 7, and the tape or stringer is secured to the parts 3 and 4.

The elements 1 and 2 are alike except that the projections and recesses of the elements 2 are arranged reversely to those of the element 1 in order that the projections and recesses of the elements at one side will register properly with the recesses and projections of the elements on the other side when the elements 1 and 2 are brought endwise into overlapping relation. Each of the elements 1 (see Figs. 4 and 5) comprises substantially an elongated flat plate having a laterally spaced projection and a recess at each side adjacent the outer end so arranged that the projection 9 on one side is in line with the recess 10 on the other side, and the projection 11 on the latter side is in alignment with the recess 12 which is located on the same side of the member as the projection 9. The elements 2 are the same as shown in Figs. 4 and 5, except that they are provided with recesses in place of the projections 9 and 11, and they are provided with projections in place of the recesses 10 and 12. With this arrangement, when the elements are brought endwise into overlapping relation by the operation of the slider 5, the projection 11 engages in a recess in an adjacent element 2, and the recess 10 receives a projection of said element 2, while the projection 9 engages in a recess of another adjoining element 2, and the recess 12 receives a projection of said latter adjoining element, and the elements 1 and 2 are thereby interlocked against direct separation and held securely against slipping sidewise out of engagement when the fastener is bent or doubled over. In view of the location of the projections and recesses closely adjacent the lateral edges of the elements, an extremely sharp lateral angular adjustment of the adjoining interlocked elements is necessary to release the projection and recess at the inner side of the bend, and such extreme angular adjustment is prevented by the corded edge 7 of the stringer 8, upon which the elements are mounted.

To facilitate the bending or doubling over of the interlocked fastener and to avoid cramping or prying action between the extreme forward end corners of each element and the adjoining element with which it is interlocked, the elements 1 and 2 may be provided at one side or at both sides if desired, immediately behind the projection and recess on such side with notches 13 which afford clearance for the corners of the element which is interlocked therewith when the fastener is bent or doubled over sharply.

The projections and recesses are not necessarily of the form shown in Figs. 1 to 5 inclusive, but they may be otherwise formed if desired, for example, as shown in Figs. 6, 7 and 8, wherein a transverse portion of each element adjacent the end is formed as shown particularly in Fig. 6, in substantially an S-shape, which results in projections 14 and 15 at opposite sides respectively of the element and corresponding recesses 16 and 17 likewise formed in the opposite sides respectively of the element. With this construction and that of the fastener shown in Figs. 1 to 5 inclusive, if any element became released at the inner side of the bend and had a tendency to slip sidewise out of engagement, the projection of said element at the inner side of the bend would have to ride up over the projection of the adjoining element at the outer side of the bend before such disengagement would be completely effected and thus the security of interlocking against lateral disengagement or side slipping is greater than when a single projection and a single recess is provided in each element or when a plurality of projections are all arranged at one side of the element and the recesses likewise at the other side.

While I have shown and described my invention in a preferred form, I am aware that various changes and modifications may be made without departing from the principles of my invention, the scope of which is to be determined by the appended claim.

I claim as my invention:

In a fastening device of the class described, the combination of opposed series of elongated flat members and a slider operable therealong for inserting the end portions of the members of one series between the end portions of the members of the other series, said end portions of the members of both series being substantially S-shaped in transverse section to afford raised and recessed interlocking parts at each side of the member.

GEORGE W. BLAIR.